United States Patent
Wilson

[15] 3,653,909
[45] Apr. 4, 1972

[54] RUMINANT FEED COMPOSITION

[72] Inventor: Benjamin B. Wilson, Colonial Heights, Va.

[73] Assignee: Allied Chemical Corporation, New York, N.Y.

[22] Filed: Feb. 9, 1970

[21] Appl. No.: 9,954

[52] U.S. Cl..........................99/2 R, 99/2 N, 99/6, 195/29
[51] Int. Cl. .............................................A23k 1/00
[58] Field of Search ..................99/2 R, 2 N, 2 CD, 6; 71/26–30, 34–36, 64 C; 424/249

[56] References Cited

UNITED STATES PATENTS

| | | | |
|---|---|---|---|
| 2,819,968 | 1/1958 | Colby et al. | 99/2 |
| 3,523,798 | 8/1970 | Kail | 99/2 |
| 2,882,141 | 4/1959 | O'Donnell | 71/30 |
| 3,142,558 | 7/1964 | Beckham et al. | 71/29 |
| 3,512,986 | 5/1970 | Snyder et al. | 99/2 |
| 3,420,672 | 1/1969 | Appleman | 99/2 |

*Primary Examiner*—Norman Yudkoff
*Assistant Examiner*—Curtis P. Ribando
*Attorney*—Fred L. Kelly and Patrick L. Henry

[57] ABSTRACT

Ruminant feed compositions that improve the nitrogen intake retained by the ruminant and the production of volatile fatty acids in the rumen are formulated to contain protein, carbohydrates and as a source of nonprotein nitrogen, a mixture of urea and melamine. The ratio of the weight of the urea nitrogen to the weight of melamine nitrogen is preferably between about 0.8 and about 1.2 and the sum of the weight of the urea and melamine nitrogen constitutes preferably between about 25 and about 50 percent of the total nitrogen in the ruminant feed.

10 Claims, No Drawings

RUMINANT FEED COMPOSITION

BACKGROUND OF THE INVENTION

This invention is concerned with feed compositions for ruminants and is particularly directed to such compositions which provide nonprotein nitrogen products to assist the microorganisms in the rumen of such animals to produce protein, volatile fatty acids and other materials of value to the ruminant.

Ruminants, including cattle, sheep, goats and camels are of great economic importance over much of the world for such purposes as sources of food, fiber, hides and power. In many places the natural forage available to such animals is deficient in nitrogen, phosphorus or other elements which are important for the ruminants'growth and health. There has been a continuing interest in supplementing the diet of ruminants to overcome such deficiencies and to provide improved feeds for ruminants that are penned or otherwise confined to limited areas.

Providing a nitrogen-containing feed supplement for ruminants is complex. Such factors as cost and utilization must be considered, for although a wide variety of materials containing nitrogen have been suggested, many materials are economically unfeasible as supplements in the amounts required. Some, while relatively inexpensive on a weight basis are not properly utilized by the ruminant and therefore are uneconomical.

Consideration of the diet of ruminants includes a consideration of the symbiotic microorganisms that are normally present in the rumen of such animals since such microorganisms are an essential factor in the animals nutrition, as discussed in U.S. Pat. No. 2,768,895 and elsewhere. It is preferable for the supplement to assist the ruminant's symbiotic assimilation of microorganisms so as to increase the ruminant's appetite for inexpensive roughage which may conveniently be provided as corn cobs, straw, stover, hay or other such agricultural by-products.

Another factor in selecting materials as supplements is palatability. Ruminants exhibit preferences and selection in the materials offered to them for ingestion. The supplement should be palatable so that the ruminant will of its own accord ingest the proper quantity of the supplement.

It has been suggested in the past that urea be used as a nitrogen-containing ruminant feed supplement. However, the forms of urea heretofore proposed or used as such feed supplements have not been entirely satisfactory. While urea can be assimilated by ruminants, the efficiency of nitrogen retention by the animal is a minor percentage of the urea fed. Moreover, urea feeding must be carried out with considerable care in order to minimize potential hazards of ammonia release resulting from hydrolysis of the urea to ammonia at a rate greater than the microorganisms of the rumen can use it. The excess ammonia finds its way into the blood stream of the ruminant with possible resulting alkalosis or death of the animal.

U.S. Pat. No. 2,819,968 discloses that melamine can be used as a source of nitrogen to supplement the protein feed of ruminants. Melamine is relatively stable to hydrolysis yet is utilizable by the rumen microorganisms. However, melamine is relatively expensive as compared with urea, and its nitrogen retention by the ruminant is too low to compensate for its greater cost. Accordingly, urea has remained in widespread use in spite of its serious drawbacks as described hereinabove.

SUMMARY OF THE INVENTION

It is an object of the present invention to overcome the disadvantages of the prior art and to provide an improved, low-cost method for adding slowly available nonprotein nitrogen to ruminant feed compositions.

Another object of the invention is to provide a ruminant feed composition that will improve nitrogen intake retained by the ruminant as well as the production of volatile fatty acids in the rumen.

It is a further object of the invention to provide from nonprotein nitrogen supplements a food for rumen microorganisms of low potential hazards from ammonia-nitrogen absorption by the ruminant.

According to the present invention, ruminant feed compositions are formulated containing protein, carbohydrates and as a supplementary source of nitrogen other than protein, urea and melamine in amounts such that the ratio of the weight of urea nitrogen to the weight of melamine nitrogen is between about 0.6 and about 1.4, and preferably between about 0.8 and about 1.2. Also the amounts of urea and melamine used are such that the sum of the weight of the urea nitrogen and the weight of the melamine nitrogen constitutes between about 5 percent and about 60 percent of the total nitrogen of the ruminant feed, and preferably between about 25 percent and about 50 percent thereof.

The compositions may be in the form of a solid or a liquid; however, feed supplements are preferably in the form of an aqueous suspension. An aqueous suspension can be formulated to contain up to about 50–75 percent by weight ruminant food without sacrificing the operational advantages of a simple liquid.

PREFERRED EMBODIMENT OF THE INVENTION

An especially preferred ruminant feed composition according to the present invention has a weight ratio of urea nitrogen to melamine nitrogen between about 0.9 and 1.1. The sum of the weight of the urea nitrogen and the weight of the melamine nitrogen in such especially preferred composition constitutes between about 40 percent and about 50 percent of the total nitrogen of the ruminant feed. Preferably, the urea and melamine is contained in an aqueous suspension ruminant feed supplement formulated to further comprise a polyphosphate as a chelating agent and molasses as a suspension promoter. Molasses is preferably present in amount between about 5 percent and about 50 percent by weight of the composition. A colloidal dispersion of starch granules may also be used as a suspension promoter, if desired.

Fluid suspension ruminant feed supplements are generally aqueous suspensions of ruminant-nourishing compounds of phosphorus, nitrogen, magnesium, calcium, and sulfur. In general, the aqueous suspension ruminant feed supplements contain three to five of the above kinds of nutrients as well as sodium chloride and minor amounts of other beneficial additives.

The production and use of aqueous suspension ruminant feed supplements is becoming an increasingly attractive alternative to dry feed supplements. Suspension feed supplements have several advantages over dry supplements. For example, aqueous suspension feed supplements can be formulated to contain up to about 75 percent by weight ruminant food without sacrificing the operational advantages of simple liquid. A further advantage of suspension feed supplements is the relative ease by which the compositions thereof can be varied. Moreover, a suspension feed supplement can be readily sprayed onto a dry basal feed ration to overcome the inherent difficulty of achieving uniform distribution by dry-mixing procedures.

Any of the commercially available forms of urea and melamine may be used to formulate the ruminant feed compositions of the present invention. Prilled or crystalline forms of urea may be used or the urea may be derived from a 69 percent aqueous urea solution which is readily available at a lower cost than prilled or crystalline urea.

Melamine is also produced commercially, for example, from urea in accordance with U.S. Pat. No. 3,470,163. A low-cost crude melamine containing about 3 percent to 10 percent water-insoluble impurities, essentially a mixture of melem, ammeline and ammelide, may be advantageously used to reduce the cost of the feed. In the examples furnished hereinafter, "crude melamine" is the description given to melamine produced from an aqueous crude melamine slurry that is prepared and stripped of ammonia and carbon dioxide as described in U.S. Pat. No. 3,161,638. The aqueous slurry is filtered and the solids dried; the percentage composition is:

| Material | Weight Percent |
|---|---|
| Melamine | 94.60 |
| $NH_3$ | 0.04 |
| $CO_2$ | Trace |
| Urea | Trace |
| Biuret | 0.08 |
| Cyanuric acid | 0.00 |
| Melem, ammeline and ammelide | 4.90 |

Preferred polyphosphates suitable for use in this invention are the ammoniated polyphosphoric acids, which are preferably (but not necessarily) employed in commercially available forms, e. g., "Poly-N," which is an aqueous ammoniated wet-process superphosphoric acid. This material can be obtained by evaporating aqueous wet-process phosphoric acid so as to form wet-process superphosphoric acid which is then ammoniated in the presence of water to give aqueous ammoniated wet-process superphosphoric acid.

An aqueous ammoniated superphosphoric acid having the following properties which will hereinafter be referred to as "Solution A," was found to be useful for purposes of the present invention:

| | |
|---|---|
| Nitrogen | 10% by weight |
| Phosphorus[1] (as $P_2O_5$) | 34% by weight |
| Trace minerals | 1 to 2% by weight |
| iron ($Fe_2O_3$) | ca. 1.0% by weight |
| calcium (CaO) | ca. 0.1% by weight |
| magnesium (MgO) | ca. 0.3% by weight |
| pH | 6.0 |
| Specific gravity at 60° F. | 1.4 |
| Salting out temperature | 0° F. |

[1] Distribution as percent by weight of the ammonium phosphates present was about:

| | |
|---|---|
| 37% | ammonium orthophosphate |
| 49% | ammonium pyrophosphate |
| 8% | ammonium tripolyphosphate |
| 5% | ammonium tetrapolyphosphate |
| 1% | higher ammonium phosphates |

The preferred aqueous suspension ruminant feed supplements of the present invention are two-phase (solid-liquid) compositions which can be produced and stored for at least 24 hours without any significant sedimentation or growth of large crystals and solid aggregates (i. e., crystals and aggregates large enough to cause clogging or pipelines and spraying equipment). This period of stability enjoyed by the fluid suspensions of the present invention permits the utilization thereof without the need for constant agitation or redispersion of the suspended particles between the time the suspensions are formulated and the time of their application. Without wishing to be bound by theory, it is believed that the advantages of the present invention are achieved in part by virtue of the sequestering action of the polyphosphates on the iron and various other trace mineral components. Moreover, soluble magnesium compounds react with pyrophosphates to produce magnesium pyrophosphates in the form of needle-shaped crystals which act as a random lattice or matrix within the fluid suspension, somewhat analogous to a haystack. This lattice entraps the suspended particles and retards the rate of fall-out thereof, and also promotes the formation of small crystals.

As stated hereinabove, molasses-like suspension promoters can be advantageously employed conjointly with the use of a polyphosphate. However, the presence of molasses in the suspension feed supplements of this invention, albeit desirable, is by no means essential, e.g., starch may be used in lieu of molasses. When it is desired to include the use of molasses-like suspension promoters in formulating the aqueous suspension feed compositions of the present invention, it is preferred that such molasses-like materials be used in amounts between about 5 percent by weight and about 50 percent by weight of the total composition. Additional substances, which are beneficial to ruminants and whose use is conventional in the art, may be incorporated into the suspension ruminant feed supplements of the present invention. Such substances include, for example, antibiotics, diethylstilbestrol, various vitamins, and compounds of zinc, iron, cobalt, copper, manganese and magnesium. The use of such additives, while advantageous, is nevertheless regarded as ancillary feature of the present invention.

In preparing the novel suspension ruminant feed supplements of the present invention, the order of mixing the ingredients is not critical; the advantages of the present invention are realized using any mixing procedure which achieves a uniform suspension. However, if starch is used as the suspension promoter, it should be in the form of a colloidal dispersion of starch granulates. The starch dispersion is preferably prepared by agitating the starch in aqueous urea and/or melamine, preferably at about 40° to 70° C. Agitation is required because starch is not effective as a suspending agent until the particles thereof are broken down. If it is desired to include molasses-like suspension promoters, it is preferably done at this stage. After the above-mentioned components are blended, a water-soluble polyphosphate is added and blended into the mixture. Finally, calcium carbonate and other conventional ruminant nutrients and the like which are desired to be suspended are added to the system. Alternatively, the calcium carbonate and other materials to be suspended can be added prior to the addition of the polyphosphate. The aqueous suspension of the present invention can be formulated at ambient temperature or slightly thereabove with conventional agitation. Ambient temperatures are herein defined to mean temperatures substantially below the boiling point of water, and preferably between about 40° C. and about 70° C.

The examples which follow illustrate embodiments of the invention wherein ruminants were fed a urea-melamine supplementary feed as a potential source of their protein ingestion, which supplements are more effectively used by the animal than urea per se and with considerable decrease in the potential hazard involved in unmodified urea feeding. In these examples, parts and percentages are by weight unless otherwise indicated.

For economic reasons in formulating the ruminant feed compositions described in the examples, the melamine is derived from a crude melamine containing 65.4 percent nitrogen, which is readily available as described hereinabove at a lower cost than pure melamine. It is not intended, however, to limit the source of melamine to this material. The polyphosphate is derived from "Solution A," an aqueous ammoniated superphosphoric acid, described in detail hereinabove. Solution A contains 34 percent phosphate measured as $P_2O_5$ of which about 63 percent is present as polyphosphates, chiefly ammonium pyrophosphate.

EXAMPLE 1

A liquid feed supplement for increasing the nitrogen level of predominantly high cellulose ruminant feedstuffs was prepared by mixing the following ingredients.

| Material | Parts of Weight |
|---|---|
| Molasses | 1,300.0 |
| Solution A | 200.0 |
| Ammonium sulfate | 30.0 |
| Crude Melamine (65.4% N) | 56.5 |
| Urea | 79.2 |
| Salt | 120.0 |
| Trace Mineral Mix | 4.0 |
| Vitamin Mix | 0.3 |
| Water | 210.0 |

The liquid supplement could be sprayed onto a basal ruminant feed without difficulty using conventional equipment for dispensing liquid feed supplements. The supplement contained about 32 percent equivalent.

EXAMPLE 2

A liquid feed supplement for increasing the nitrogen level of predominantly high starch ruminant feedstuffs was prepared by mechanically mixing the following ingredients:

| Material | Parts by Weight |
| --- | --- |
| Molasses | 1,000 |
| Solution A | 268 |
| Ammonium sulfate | 30 |
| Crude Melamine (65.4% N) | 110 |
| Urea | 126 |
| Vitamin - mineral mix | 5 |
| Salt | 200 |
| Water | 257 |

The liquid supplement could be sprayed without difficulty onto a basal ruminant feed. The liquid supplement contained about 50 percent protein equivalent.

EXAMPLE 3

A solid feed supplement for increasing the nitrogen level of predominantly high cellulose ruminant feedstuffs was prepared by mechanically mixing the following ingredients.

| Material | Parts by Weight |
| --- | --- |
| Ground yellow corn | 1,617 |
| Crude Melamine (65.4% N) | 54 |
| Urea | 92 |
| Dicalcium phosphate | 38 |
| Diammonium phosphate | 100 |
| Salt | 120 |
| Vitamin - mineral mix | 5 |

The supplement contained about 32 percent protein equivalent.

EXAMPLE 4

A solid feed supplement for increasing the nitrogen level of predominantly high starch ruminant feedstuffs was prepared by mechanically mixing the following ingredients.

| Material | Parts by Weight |
| --- | --- |
| Ground yellow corn | 1,340 |
| Crude melamine (65.4% N) | 166 |
| Urea | 232 |
| Dicalcium phosphate | 38 |
| Diammonium phosphate | 100 |
| Salt | 120 |
| Vitamin - mineral mix | 5 |

The supplement contained about 50 percent protein equivalent.

EXAMPLE 5

A fluid suspension ruminant feed supplement was prepared having the following composition:

| Ingredient | Pounds per 1,000 Pounds of Product |
| --- | --- |
| Water | 507.00 |
| Wheat flour | 40.00 |
| Melamine | 53.00 |
| Urea Liquor (69wt. % urea) | 110.00 |
| Solution A | 67.15 |
| Ammonium Sulfate | 15.00 |
| Trace Mineral Mix | 2.25 |
| Sodium chloride | 100.00 |
| Ca—Mg Carbonates (powdered form) | 105.00 |
| Diethylstilbestrol Solution | 0.25 |
| Vitamin Mix | 0.35 |

The 0.5 ton batch was prepared as follows: About 200 pounds of water was placed in a mixing tank and heated to 43° C. Next, 40 pounds of flour was added with vigorous stirring. After a smooth, lump-free mix was obtained, 53 pounds of melamine and 110 pounds of 69 percent urea liquor at 65° C. were added and sufficient steam was added to raise the temperature to 68° C. The temperature was held at 68° C. for 5 minutes and the remaining water and other ingredients were added. The mixture was stored and allowed to cool to room temperature. Brookfield viscosity of the final mixture was about 450 centipoises.

EXAMPLE 6

This example relates to growth tests on ruminant feeds containing urea and crude melamine.

A molasses-urea-crude melamine supplement was prepared containing 372 parts water, 372 parts molasses, 150 parts urea, and 106 parts crude melamine. The ratio of the weight urea nitrogen to the weight melamine nitrogen was about 1. Five wether lambs were fed a low-quality roughage ration at two levels of energy intake, supplemented with the molasses-urea-crude melamine mixture to give a total ration containing about 10 percent protein equivalent. First, a low level of energy intake was fed for 30 days, then a high level of energy intake was fed for 53 days. The ration consisted of:

| Material | | Parts by Weight | |
| --- | --- | --- | --- |
| | | Low energy | High energy |
| Pelleted prairie hay (about 0.7%N) | | | |
| Contents | Proportions | | |
| Prairie hay | 18.36 parts | | |
| Cane molasses | 1.00 parts | | |
| Dicalcium phosphate | 0.05 parts | | |
| Monosodium phosphate | 0.07 parts | 90 | 75 |
| Mineral salt | 0.12 parts | | |
| Vegetable fat | 0.39 parts | | |
| Vitamins | 0.01 parts | | |
| Yellow corn (about 1.5%N) | | 0 | 15 |
| Soybean meal (about 6.8%N) | | 5 | 5 |
| Molasses-urea-crude melamine (about 14%N) | | 5 | 5 |

The lambs were fed twice a day that quantity of the ration they would consume in 1.5 hours. The lambs gained an average of 6 pounds during the 30-day growth trial and 15 pounds during the total 83-day growth trail.

In a comparative test using a molasses-urea supplement containing 14 percent N, five wether lambs gained only 11 pounds in a similar 83-day growth trial.

EXAMPLE 7

This example demonstrates the synergistic effect of feeding lambs a molasses-urea-crude melamine supplement prepared as in Example 6, as compared to a molasses-urea supplement and a molasses-crude melamine supplement containing the same amount of nitrogen, i.e., 14 percent N. The test was carried out in a series of controlled experiments using the low-energy roughage ration described in Example 6. The supplements each furnished about 42 percent of the total nitrogen intake of the ruminants. Growing lambs were used to measure nitrogen retention, rumen volatile fatty acids and rumen ammonia. The lambs were fed the test rations for 8 weeks prior to the actual test period which was 7 days. The results were as follows:

| Number of Lambs | 4 | 4 | 3 |
|---|---|---|---|
| Nitrogen Source | Crude Melamine | Urea | Crude Melamine + Urea |
| Wt N Intake Retained | 6.4 | 4.1 | 6.2 |
| % N Intake Retained | 24.0 | 15.5 | 23.0 |
| Rumen Volatile Fatty Acids, $\mu$ mole/ml. | 59.4 | 61.0 | 72.2 |
| Rumen NH$_3$, mg./100ml. | 1.1 | 4.0 | 2.9 |

The data indicate a benefit of 8.5 percent units in nitrogen retention of lambs fed crude melamine as compared to urea. When 50 percent of supplemental nitrogen is derived from urea and 50 percent from crude melamine, a synergistic response results. This is evident with both percent nitrogen intake retained and rumen volatile fatty acids.

I claim:

1. A ruminant feed composition comprising a ruminant-edible carbohydrate, a ruminant-edible protein and as a source of nitrogen other than protein, urea and melamine, the ratio of the weight of the urea nitrogen to the weight of the melamine nitrogen being between about 0.6 and about 1.4, and the sum of the weight of the urea nitrogen and the weight of the melamine nitrogen constituting between about 5 percent and about 60 percent of the total nitrogen content of the feed.

2. A ruminant feed composition as claimed in claim 1, wherein the composition is an aqueous suspension, said composition further containing a suspension promoter consisting of molasses in amount between about 5 percent and about 50 percent by weight of the composition.

3. A ruminant feed composition as claimed in claim 2, wherein the melamine is a crude melamine containing about 90 to 97 percent by weight melamine.

4. A ruminant feed composition comprising a ruminant-edible carbohydrate, a ruminant-edible protein and as a source of nitrogen other than protein, urea and melamine, the ratio of the weight of the urea nitrogen to the weight of the melamine nitrogen being between about 0.8 and about 1.2, and the sum of the weight of the urea nitrogen and the weight of the melamine nitrogen constituting between about 25 percent and about 50 percent of the total nitrogen content of the feed.

5. A ruminant feed composition as claimed in claim 4, wherein the composition is an aqueous suspension, said composition further containing a suspension promoter consisting of molasses in amount between about 5 percent and about 50 percent by weight of the composition.

6. A ruminant feed composition as claimed in claim 5, wherein the melamine is a crude melamine containing about 90 percent to 97 percent by weight melamine.

7. A ruminant feed composition comprising a ruminant-edible carbohydrate, a ruminant-edible protein and as a source of nitrogen other than protein, urea and melamine, the ratio of the weight of the urea nitrogen to the weight of the melamine nitrogen being between about 0.9 and about 1.1, and the sum of the weight of the urea nitrogen and the weight of the melamine nitrogen constituting between about 40 percent and about 50 percent of the total nitrogen content of the feed.

8. A ruminant feed composition as claimed in claim 7, wherein the composition is an aqueous suspension, said composition further containing a suspension promoter consisting of molasses in amount between about 5 percent and about 50 percent by weight of the composition.

9. A ruminant feed composition as claimed in claim 8, wherein the melamine is a crude melamine containing about 90 percent to 97 percent by weight melamine.

10. In a process for the preparation of a ruminant feed composition containing ruminant-edible carbohydrates, minerals, ruminant-edible protein and other nitrogen containing substances, the improvement which comprises incorporating in the composition urea and melamine, the ratio of the weight of the urea nitrogen to the weight of the melamine nitrogen being between about 0.6 and about 1.4 and the sum of the weight of the urea nitrogen and the melamine nitrogen constituting between about 5 percent and about 60 percent of the total nitrogen content of the feed.

* * * * *